United States Patent [19]

Aubry et al.

[11] Patent Number: 5,208,196

[45] Date of Patent: May 4, 1993

[54] ALUMINUM BRIDGED CLAYS

[75] Inventors: Alain Aubry, Joinville Le Pont; Jean-Michel Popa, Drancy, both of France

[73] Assignee: Rhone-Poulenc Chimie, Courbevoie, France

[21] Appl. No.: 634,438

[22] Filed: Dec. 27, 1990

[30] Foreign Application Priority Data

Dec. 27, 1989 [FR] France .................... 89 17230

[51] Int. Cl.$^5$ .................... B01J 21/16; B01J 20/12
[52] U.S. Cl. .......................... 502/63; 502/84
[58] Field of Search ...................... 502/84, 63

[56] References Cited

U.S. PATENT DOCUMENTS

| | | | |
|---|---|---|---|
| 4,436,832 | 3/1984 | Jacobs et al. | 502/84 |
| 4,465,892 | 8/1984 | Jacobs et al. | 585/739 |
| 4,757,040 | 7/1988 | Guan et al. | 502/84 |
| 4,839,318 | 6/1989 | Kawase et al. | 502/84 |
| 4,981,825 | 1/1991 | Pinnavaia et al. | 502/84 |
| 4,987,106 | 1/1991 | Mizutani et al. | 502/84 |

FOREIGN PATENT DOCUMENTS 0073718  3/1983  European Pat. Off. .
0197012  5/1987  European Pat. Off. .

OTHER PUBLICATIONS

Chemical Abstracts, vol. 110, No. 12, Mar. 20, 1989, p. 171.
Chemical Abstracts, vol. 102, No. 5, Feb. 4, 1985, p. 527.

*Primary Examiner*—Carl F. Dees
*Attorney, Agent, or Firm*—Burns, Doane, Swecker & Mathis

[57] ABSTRACT

Novel aluminum bridged clays having an interfoliate spacing of at least 1 nm, well adapted as catalysts/catalyst supports, are prepared by (a) controlledly introducing an aqueous solution of a hydroxide base into an aqueous reaction medium containing suspended clay particulates and a dissolved aluminum salt, at a rate and for such period of time that the ratio of the concentration [C] of the base, in moles of OH$^-$ and expressed in moles/liter, to the duration (h) of introducing such OH$^-$ values, expressed in hours, is at least 0.1, and (b) recovering the reaction product bridged clay thus produced (and optionally drying/lyophilizing and/or calcining same).

30 Claims, No Drawings

ALUMINUM BRIDGED CLAYS

BACKGROUND OF THE INVENTION

1. Field of the Invention

The present invention relates to novel bridged clays having a large interfoliate spacing and to a process for the preparation of such novel bridged clays.

2. Description of the Prior Art

It is known to this art that certain clays have a structure characterized by an expandable lattice. In effect, they are capable of absorbing water, in particular between the different lamella thereof. Clays of the smectite and vermiculite categories exhibit this property. The structure of these clays may be simply described as triple layer lamella having an approximate thickness of 1 nm, containing two layers of $SiO_4$ tetrahedrons, separated by a layer of $MX_6$ octahedrons, in which M is a trivalent ion, for example $Al^{3+}$ in the case of dioctahedron clays or a divalent ion, for example $Mg^{2+}$ in the case of trioctahedron clays: X is an oxygen atom, a hydroxyl group OH or a fluorine atom F.

The silicon atoms of the tetrahedrons may be replaced in part by aluminum atoms and the aluminum atoms and magnesium atoms of the octahedrons may be respectively substituted, in particular, by magnesium or iron atoms, and lithium atoms.

Because of the expandable nature of such clays, they are used in the field of catalysis, where the largest possible surface area accessible to the reagents is desired.

However, the application of nonbridged clays as catalysts or catalyst supports is limited to catalysis in the liquid phase, as expanded clays undergo desiccation beginning at the boiling temperature of the solvent. This results in a loss of their expanded nature and, therefore, of their accessible interlamellar surface area.

This art has sought to expand clays by a different technique, to permit their employment as catalysts or catalyst supports in the gaseous phase also.

Thus, it is known to expand the clays by introducing or inserting a mineral species between the clay lamella, thereby creating pillars or bridges. Hence, the clays produced in this manner are designated "bridged clays".

A well-known technique entails establishing the bridging by means of oligomers of a metal hydroxide, in particular aluminum.

Typically, such bridging of clays is carried out via a three-stage process:

(i) preparation of the aluminum pillar $Al_{13}$ of the formula: $[Al_{13}O_4(OH)_{24+x}(H_2O)_n](7-x)+$ (with x ranging from 0 to 4 and n characteristically ranging from 8 to 12) from an aluminum salt and a base;

(ii) mixing the solution containing the source of $Al_{13}$ with the aqueous clay solution; and (iii) washing or dialysis of the final product.

In particular, FR 2,512,043 describes a process of the above type.

The process described in FR 2,512,043 permits synthesis of a bridged aluminum clay, the basal spacing of which is a maximum of 1.95 nm, corresponding to an interfoliate spacing of at most 1 nm.

As utilized herein, by the expression "interfoliate spacing" is intended the spacing between two lamella and by the expression "basal spacing", represented by $d_{001}$, is intended the sum of the thickness of a lamella and the interfoliate spacing.

Microporous materials having a bridged lamellar structure may present desirable form selective properties in catalysis, if the size of their pores (porosity) corresponds to that of the molecules of the reagents and the product of the reaction. But the molecules used in fine chemistry frequently are larger than 1 nm, which renders bridged clays having a smaller interfoliate spacing useless for such applications.

SUMMARY OF THE INVENTION

Accordingly, a major object of the present invention is the provision of novel bridged clays having a porosity greater than 1 nm and which are useful as catalysts/catalyst supports in the field of fine chemistry.

Another object of this invention is the provision of novel bridged clays, the interfoliate spacing of which is stable and maintained if the clay is subjected to a heat treatment.

Briefly, the present invention features novel clays bridged by aluminum pillars and having an interfoliate spacing of at least 1 nm, preferably at least 1.2 nm and even more preferably ranging from 1.5 to 3.0 nm.

One of the characteristics of the novel clays of this invention is that they have good thermal stability. Thus, when subjected to a temperature ranging from 300° to 800° C., they retain an interfoliate spacing within the range indicated above.

The bridged clays of the present invention are novel in terms of their structure. Their chemical composition differs slightly from that of bridged clays having a smaller interfoliate spacing.

As indicated above, they have a triple layer lamellar structure with a lamella thickness of about 1 nm, comprising two $SiO_4$ tetrahedron layers, separated by an aluminum pillar which comprises an aluminum oxyhydroxide.

The silicon atoms may be substituted, in particular, by aluminum or iron atoms.

The present invention also features a process for the preparation of such novel bridged clays having large interfoliate spacing.

This process comprises introducing an aqueous solution of a base into a reaction medium containing an aluminum salt and the clay in an aqueous suspension, then separating the product thus produced, and wherein the addition of the base to the reaction medium is carried out in a manner such that the ratio of the concentration [C] in $OH^-$ moles, expressed in moles/liter, to the duration of the addition (h) of the $OH^-$ moles, expressed in hours, is at least 0.1 and preferably ranges from 0.1 to 5.0.

DETAILED DESCRIPTION OF THE PREFERRED EMBODIMENTS OF THE INVENTION

More particularly according to the present invention, it has now been determined that novel bridged clays having characteristically larger interfoliate spacing may be produced by controlling the formation of the aluminum hydroxide colloids by the concentration of $OH^-$ ions in the reaction medium, as well as the rate of their addition.

The process of the invention is applicable to all clays of natural or synthetic origin that are swellable in nature.

The preferred clays according to the invention are the smectites. The following are exemplary thereof:

(i) Montmorillonite $[Al_{1.67}Mg_{0.33}(Na_{0.33})]Si_4O_{10}(OH)_2$ (ii) Beidellite $Al_2[Al_{0.33}(Na_{0.33})Si_{3.67}]O_{10}(OH)_2$ (iii) Hectorite $[Mg_{2.67}Li_{0.33}(Na_{0.33})]Si_4O_{10}(OH)_2$.

These formulae are illustrative only.

It is also possible to use a clay of the vermiculite type.

In a preferred embodiment of the process according to the invention, a clay is used that has been subjected to a treatment whereby the calcium cations contained in the clay are replaced by sodium cations. This treatment is known to the art and has the effect of improving the swellability of the clay. It is typically characterized by contacting the clay with an aqueous solution of a sodium salt, preferably sodium chloride.

The amount of the sodium salt is most typically in excess relative to the exchange capacity of the clay. The excess of sodium salt may be eliminated by washing the thus modified clay with water.

It is also possible to similarly replace the calcium cations with $H^+$ ions, preferably introduced by means of a strong acid, for example hydrochloric, sulfuric, nitric, or the like. For example, an acid solution having a normality of about 1N may be used.

According to this invention, a salt of an aluminum cation is used. The aluminum cation is the cation comprising the bridging pillar between the lamella.

With respect to the nature of such salt, any soluble aluminum cation salt may be used. It is advantageously employed in the form of the nitrate or the chloride.

Such salt may be introduced either in the solid form or as an aqueous solution.

The process of the present invention also requires another reagent, i.e., a base. By "base" is preferably intended a base having a pKb of less than or equal to 5.0.

Exemplary of such bases are the hydroxides of an alkali or alkaline earth metal, or of ammonium. In particular, sodium hydroxide, potassium hydroxide, calcium hydroxide and ammonium hydroxide are the preferred bases.

Other suitable bases include the hydroxides of tetraalkyl-ammonium, preferably those containing an alkyl radical having 1 to 4 carbon atoms, and more preferably tetramethylammonium or tetraethylammonium hydroxide.

The process of the invention comprises adding the basic solution to the reaction medium containing the clay, in aqueous suspension, and an aluminum salt.

The concentration of the clay in the reaction medium is preferably as high as possible, while maintaining the condition of easy manipulation.

Such concentration advantageously ranges from 0.1 g/l to 20 g/l.

The concentration of the base in the initial solution is advantageously less than 1N, and preferably ranges from 0.1N to 0.3N.

As regards the proportions of the different reagents, a weight ratio is established, between the weight of the salt of the Al cation expressed as the weight of the oxide thereof, and the weight of the clay placed in suspension, that preferably ranges from 0.1 to 6.0 and even more preferably from 1.0 to 5.0.

The amount of the base introduced into the reaction medium is such that the molar ratio between the number of $OH^-$ moles and the number of $Al^{3+}$ cation moles is less than 3.0 and preferably ranges from 2.0 to 2.7; even more preferably it ranges from 2.3 to 2.7.

According to the process of the invention, the basic solution is added rapidly to the reaction medium. In order to quantify this parameter, the ratio between the concentration [C] in moles of $OH^-$ introduced by the base, expressed in moles/liter, and the duration of the addition (h) of the moles of $OH^-$, in hours, is established.

The ratio advantageously ranges from 0.1 to approximately 5.0.

The preferred ratios ranges from 0.3 to 2.0.

The process of the invention is advantageously carried out at the ambient temperature (typically ranging from 15° to 25° C.).

The reaction medium is characteristically agitated throughout the entirety of the process.

The final pH of the reaction medium characteristically ranges from about 4 to about 6.

Upon the completion of the treatment, the clay is recovered by conventional solid/liquid separation techniques, such as, for example, filtration or centrifugation.

In a subsequent or downstream stage, the clay is subjected to a heat treatment. It may be subjected directly to a calcination operation, or it may be dried first.

The drying conditions may vary over wide limits. Thus, the temperature may range from 80° to 120° C., and preferably is about 100° C. The duration of drying preferably ranges from 2 to 48 hours. The drying operation may be carried out in air or under a reduced pressure, for example at a pressure ranging from 1 to 100 mm mercury (133.322 pa to 13332.2 Pa).

In another embodiment of the invention, the separated clay is subjected to a lyophilization treatment. This is carried out by suddenly freezing the product at a temperature preferably ranging from −10° C. to −50° C., followed by sublimation under reduced pressure, such pressure not being critical and preferably ranging from $10^{-5}$ to 0.5 atmosphere.

In a final stage of the process of the invention, the optionally dried clay is subjected to calcination at a temperature ranging from 300° to 800° C., preferably from 350° C. to 600° C. It has a duration of about 1 to 6 hours and preferably about 2 hours.

Novel clays bridged by aluminum pillars are thus produced having an interfoliate spacing greater than 1.0 nm, preferably greater than 1.2 nm and even more preferably ranging from 1.5 nm to 3.0 nm.

The novel bridged clays of the invention have good thermal stability and are thus perfectly suitable for applications in the field of catalysis, such as the catalytic cracking of paraffin hydrocarbons or the isomerization of paraffin or olefin hydrocarbons.

In order to further illustrate the present invention and the advantages thereof, the following specific example is given, it being understood that same is intended only as illustrative and in nowise limitative.

EXAMPLE (1) In this example, a clay of the montmorillonite type, from Wyoming and designated VOLCLAY bentonite, was used.

An aqueous suspension of 20 g/l of said clay was prepared, violently agitated and permitted to settle for 24 hours.

Subsequently, the grain size fraction of 2 nm was eliminated and an aqueous suspension of the clay, designated A, was obtained.

(2) In a subsequent stage, a sodium treatment was carried out. For the purpose, sodium chloride was added to the suspension, in a stoichiometric excess relative to the exchange capacity of the clay, i.e., 200 milliequivalent of sodium per 100 g clay.

The suspension was agitated for 1 hour at ambient temperature (22° C.).

The clay was separated by centrifugation at 3,000 rpm for 10 min.

The sodium chloride treatment was then repeated.

A second centrifugation was carried out and the clay was washed with distilled water until the complete disappearance of chloride ions in the wash water.

The clay was suspended in water in a proportion of 20 g/l. This constituted the suspension B.

(3) An aqueous solution of aluminum nitrate was prepared using 0.4 mole/liter of $Al(NO_3)_3.9H_2O$.

0.5 liter of this solution was added to 1.0 liter of suspension B.

The mixture was agitated at ambient temperature for several minutes. A suspension C was thus produced.

(4) To suspension C, under agitation and at ambient temperature, 900 $cm^3$ of 0.52N ammonium hydroxide was added slowly and regularly over 33 min.

The addition was discontinued and the agitation continued for 10 min.

The pH of the resulting suspension was 4.5.

The clay suspension was then centrifuged at 3,000 rpm for 10 min.

(5) The separated product was dried in an oven at 120° C. for 12 hours, then several fractions were calcined in a muffle furnace for 2 hours, at different temperatures.

Analysis of the clay by X-ray diffraction evidenced the existence of a $d_{001}$ band, which is characteristic of aluminum bridging: the $d_{001}$ symbol represents the basal spacing, which is the sum of the thickness of a lamella and the interfoliate spacing.

The results obtained are reported on the following Table:

TABLE

| Calcination temperature °C. | $d_{001}$ in nm |
|---|---|
| 350 | 3.73 |
| 450 | 2.84 |
| 550 | 2.67 |
| 700 | 2.67 |

It Will be seen from the Table that (a) the clay bridged by aluminum pillars according to the invention has a large interfoliate spacing on the order of 2.73 nm at 350° C., and that (b) said clay retains a large interfoliate spacing even when calcined at a high temperature (700° C.).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An aluminum bridged clay having an interfoliate spacing greater than 1 nm.

2. The bridged clay as defined by claim 1, having an interfoliate spacing of at least 1.2 nm.

3. The bridged clay as defined by claim 2, having an interfoliate spacing ranging from 1.5 to 3.0 nm.

4. The bridged clay as defined by claim 1, comprising a smectite or vermiculite.

5. The bridged clay as defined by claim 1, comprising two $SiO_4$ tetrahedron layers separated by aluminum pillars which comprise an aluminum oxyhydroxide.

6. The bridged clay as defined by claim 5, wherein silicon atoms comprising said tetrahedron layers are replaced by aluminum or iron atoms.

7. The bridged clay as defined by claim 1, in calcined state, the interfoliate spacing of which being stable at a temperature ranging from 300° to 800° C.

8. A process for the preparation of the bridged clay, comprising (a) introducing an aqueous solution of a hydroxide base into an aqueous reaction medium which comprises suspended clay particulates and a dissolved aluminum salt, at a rate and for such period of time that the ratio of the concentration [C] of the base, in moles of $OH^-$ and expressed in moles/liter, to the duration (h) of introducing said $OH^-$ values, expressed in hours, is at least 0.1, and (b) recovering the reaction product bridged clay thus produced.

9. The process as defined by claim 8, said [C]/(h) ratio ranging from 0.1 to 5.

10. The process as defined by claim 9, said [C]/(h) ratio ranging from 0.3 to 2.0.

11. The process as defined by claim 8, wherein the calcium ions of the starting material clay have been replaced by sodium ions or $H^+$ ions.

12. The process as defined by claim 8, said aluminum salt comprising a nitrate or chloride.

13. The process as defined by claim 8, said hydroxide base having a pKb less than or equal to 5.

14. The process as defined by claim 8, said hydroxide base comprising an alkali or alkaline earth metal or an ammonium hydroxide.

15. The process as defined by claim 8, wherein the concentration of the clay ranges from 0.1 g/l to 20 g/l.

16. The process as defined by claim 8, wherein the concentration of the initial basic solution introduced is less than 1N.

17. The process as defined by claim 8, wherein the ratio by weight of the weight of the aluminum salt to the weight of the suspended clay particulates, expressed as the oxides thereof, ranges from 0.1 to 6.0.

18. The process as defined by claim 17, said ratio ranging from 1.0 to 5.0.

19. The process as defined by claim 8, wherein the molar ratio of the number of moles of $OH^-$ values introduced by said base to the number of moles of $Al^{3+}$ cations provided by said aluminum salt is less than 3.0.

20. The process as defined by claim 19, said molar ratio ranging from 2.0 to 2.7.

21. The process as defined by claim 20, said molar ratio ranging from 2.3 to 2.7.

22. The process as defined by claim 8, comprising rapidly introducing said hydroxide base into said aqueous reaction medium.

23. The process as defined by claim 8, comprising drying the final product bridged clay at a temperature ranging from 80° to 120° C.

24. The process as defined by claim 8, comprising lyophilizing the final product bridged clay.

25. The process as defined by claim 8, comprising calcining the final product bridged clay at a temperature ranging from 300° to 800° C.

26. The process as defined by claim 25, comprising calcining at a temperature ranging from 350° to 600° C.

27. The process as defined by claim 8, comprising continuously vigorously agitating said aqueous reaction medium.

28. The process as defined by claim 8, wherein said bridged clay has a lamella thickness of about 1 nm and an interfoliate spacing of greater than 1 nm.

29. The bridged clay as defined by claim 1, having a lamella thickness of about 1 nm.

30. The bridged clay as defined by claim 1, having an interfoliate spacing of at least 1.67 nm after heat treatment for 2 hours at a temperature in a range of 350° to 700° C.

* * * * *